Apr. 24, 1923.

A. E. COVELLE 1,452,909

METHOD OF ADJUSTING GLASSES, SPECTACLES, AND THE LIKE

Filed Nov. 8, 1921

*Albert E. Covelle* INVENTOR.

BY

*J. H. McCurdy* his ATTORNEY.

Patented Apr. 24, 1923.

1,452,909

UNITED STATES PATENT OFFICE.

ALBERT E. COVELLE, OF WEST MEDFORD, MASSACHUSETTS.

METHOD OF ADJUSTING GLASSES, SPECTACLES, AND THE LIKE.

Application filed November 3, 1921. Serial No. 513,690.

*To all whom it may concern:*

Be it known that I, ALBERT E. COVELLE, a citizen of the United States, residing at West Medford, in the county of Middlesex and State of Massachusetts, have invented certain new and useful Improvements in Methods of Adjusting Glasses, Spectacles, and the like, of which the following is a specification.

This invention relates to processes of adjusting eye glasses, spectacles and the like, hereinafter for convenience referred to as glasses. The importance of adjusting the lenses of glasses and spectacles so that the optical center of each lens shall be directly in front of the pupil of the eye to be fitted is universally recognized by oculists and opticians. This adjustment can only be made, however, very crudely and roughly by the methods heretofore available; and this fact is responsible for much of the dissatisfaction experienced in wearing glasses and for a substantial part of the eye strain which many people experience even after glasses have been accurately made and fitted as carefully as has been possible by prior processes.

The usual method of adjusting glasses to the pupilary distance consists in measuring the pupilary distance with a scale while the individual to be fitted is looking at a fixed point in front of him. The optical centers of the lenses are found after they have been completed and each center is marked by a dot or a small cross. The lenses are then set in the frame or nose piece of the glasses in accordance with the pupilary distance found in the manner above described. This process, therefore, leaves much to the judgment and eye of the optician who does the measuring and fits the glasses.

It is the chief object of the present invention to devise a process which will ensure far more accurate results than have been obtainable by the processes heretofore practiced.

The nature of the invention will be readily understood from the following description when read in connection with the accompanying drawings, and the novel features will be particularly pointed out in the appended claims.

Referring now to the drawings.

Figure 1:
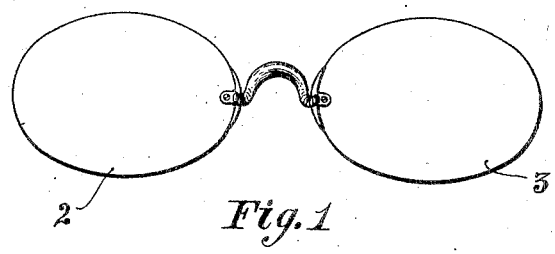
Figure 1 is an elevation of the lenses and bridge-piece of a pair of spectacles.
Figure 2:
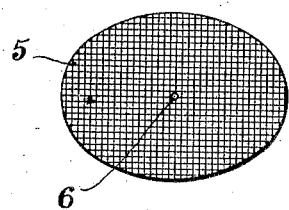
Figs. 2 and 3 are views of a disk or sticker which may conveniently be used in carrying out the present process.

According to the present process the pupilary distance of the individual to be fitted may be measured in the usual way for the purpose of making a preliminary or trial adjustment. The optical center of each lens is then determined accurately and marked by a dot, as indicated on the lenses 2 and 3, Fig. 1. This determination can be made very accurately by the methods and apparatus now in common use by opticians. The lenses are mounted in the frame or nose piece which the customer is to wear. Each lens is next covered, or substantially so, with some material that will either obscure the vision or at least prevent free vision through a greater part of the lens, a small opening being left in this material, however, at the optical center. In other words, the vision through the lens is obscured, or substantially so, except at the very restricted area immediately surrounding the optical center. I prefer to accomplish this result by pasting on each lens a sticker made of opaque paper. Such a sticker is shown in Fig. 2 at 5, and it will be observed that this sticker has a very small hole 6 through the center, the diameter of the hole being, for example, one sixteenth or one thirty-second of an inch. This hole is centered on the optical center of the lens to which it is affixed.

After a sticker has been applied to each lens in this manner, the glasses are placed in their normal position on the face of the individual being fitted and he is directed to look at a fixed object or target located at some distance away. Usually an object located about twenty feet from the individual is selected for this purpose. It will be evident that the customer's vision through the glasses is restricted entirely to the small area within the holes 6. If the two holes are located directly in front of the pupils of the respective eyes, then the customer will see but a single hole. The chances are, however, that at the first trial the lenses will not be located in this manner, and consequently the customer will see two holes. By having the customer look at a fixed object straight ahead and, while his head is in a fixed position, obscuring the vision first of one eye and then the other, it will be found that he sees one field of vision with one eye and another field of vision with the other eye. The position of these two fields of vision obviously will indicate to the optician which lens should be adjusted and the direction in which it should be adjusted. He then makes the adjustment that seems to be necessary and makes the same test again. This operation is continued until the individual sees the same field of vision with each eye. When this adjustment is secured he will see substantially but a single hole as he looks straight ahead with both eyes at a distant object.

It will readily be appreciated that when glasses have been adjusted in this manner the maximum error that can be made is less than the diameter of the hole 6, and this is a much smaller error than is likely to occur with even the most painstaking adjustment made according to the methods heretofore available.

Figure 4:
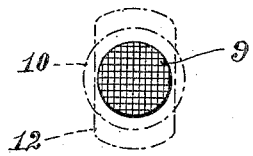
Fig. 4 is a diagram which will be referred to hereinafter.
Figure 3:
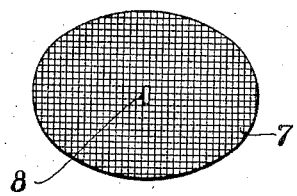

It is not necessary that the hole 6 in the disk 5 be circular, and there sometimes is an advantage in using a long narrow hole as shown at 8 in the disk 7. It also facilitates the securing of accurate results to use as a target a black disk on a white background, or vice versa, this disk being located about twenty feet away from the individual to be fitted and being properly illuminated. The size of this target and the size of the holes 6 or 8 used in the disk should be so related that as the customer looks through the small hole in the disk the target will almost fill his field of vision. This relationship is indicated diagrammatically in Fig. 4 in which 9 designates the target and the dotted line 10 shows the field of vision with the target located centrally in it as the customer would see it in looking through the hole 6. The dotted line 12 shows approximately the field of vision and its relationship to the target as the customer would see it in looking through the hole 8 with the field of view properly centered on the target.

The stickers or disks 5 and 7 preferably are made of black paper gummed with an adhesive that is readily soluble in water so that the disks may be conveniently secured to the lenses and when once centered on them will not be accidentally moved. After the proper adjustment has been made the disks may readily be washed off. Any other suitable method of securing the disks, however, may be employed.

It will now be appreciated that this invention provides a process whereby the adjustment of the lenses of glasses in the proper relationship to the pupils of the eyes may be made very exactly. Furthermore, since this adjustment is made on the glasses themselves, after all the manufacturing operations have been completed and while the glasses are on the customer's face, the opportunity for error is reduced to a minimum.

Having thus described my invention, what I desire to claim as new is:

1. That improvement in the process of adjusting spectacles, glasses and the like, which consists in restricting the vision of each eye of the individual being fitted substantially to the optical center of the respective lenses, and then adjusting the lenses until the individual, with his vision so restricted, sees the same field of vision with each eye.

2. That improvement in the process of adjusting spectacles, glasses and the like, which consists in determining the optical center of each lens, substantially covering the lenses with material preventing free vision therethrough but leaving uncovered a very restricted area immediately surrounding the optical center of each lens, and then adjusting the lenses to the individual being fitted so that said areas will appear to be substantially coincident as the individual looks at a distant object.

3. That improvement in the process of adjusting spectacles, glasses and the like, which consists in completing the manufacture of the spectacles or glasses, determining the optical center of each lens, substantially covering the lenses with material preventing free vision therethrough but leaving a very small hole in said material immediately surrounding the optical center of each lens, and then adjusting the lenses toward or from each other until the individual being fitted upon obscuring the vision first through one eye and then the other and while looking straight ahead and holding his head in a fixed position sees through said holes substantially the same field of vision with each eye.

4. That improvement in the process of adjusting spectacles, glasses and the like, which consists in completing the manufacture of the spectacles or glasses, determining the optical center of each lens, pasting on each lens a piece of opaque sheet material having a very small hole therethrough, centering said hole on the optical center of the lens, and then adjusting the lenses toward or from each other until the individual being fitted, upon looking through said holes with the glasses in their normal position, sees a field of vision with one eye having a center substantially coincident with the center of the field of vision of the other eye, the tests as to the field of vision being made while said individual looks straight ahead and holds his head in a fixed position.

5. That improvement in the process of adjusting spectacles, glasses and the like, which consists in completing the manufacture of the spectacles or glasses, determining the optical center of each lens, pasting on each lens a piece of opaque paper having a very small hole therethrough, centering said hole on the optical center of the lens, and then adjusting said lenses into such a relationship to the respective eyes of the individual being fitted that upon looking through said holes at a distant object he sees but a single hole.

ALBERT E. COVELLE.